United States Patent
Abraham et al.

(10) Patent No.: US 9,310,490 B2
(45) Date of Patent: Apr. 12, 2016

(54) NOISE DISCRIMINATION IN PHOTON COUNTING SYSTEM

(71) Applicant: Analogic Corporation, Peabody, MA (US)

(72) Inventors: Douglas Q. Abraham, Topsfield, MA (US); Basak Ulker Karbeyaz, Concord, MA (US)

(73) Assignee: Analogic Corporation, Peabody, MA (US)

( * ) Notice: Subject to any disclaimer, the term of this patent is extended or adjusted under 35 U.S.C. 154(b) by 224 days.

(21) Appl. No.: 14/019,675

(22) Filed: Sep. 6, 2013

(65) Prior Publication Data

US 2015/0069255 A1    Mar. 12, 2015

(51) Int. Cl.
*G01J 1/42* (2006.01)
*G01T 1/00* (2006.01)
*G01T 1/17* (2006.01)
*G01T 1/02* (2006.01)
*G01T 1/161* (2006.01)
*G01T 1/185* (2006.01)

(52) U.S. Cl.
CPC ... *G01T 1/17* (2013.01); *G01T 1/02* (2013.01); *G01T 1/161* (2013.01); *G01T 1/185* (2013.01)

(58) Field of Classification Search
CPC ............. G01T 1/02; G01T 1/17; G01T 1/161; G01T 1/185
USPC ......................................... 250/389, 393–395
See application file for complete search history.

(56) References Cited

U.S. PATENT DOCUMENTS

2004/0017224 A1*  1/2004  Tumer et al. ................... 327/51
2010/0051823 A1*  3/2010  Brenner et al. ............... 250/389

OTHER PUBLICATIONS

Kraft et el. Counting and Integrating Readout for Direct Conversion X-ray Imaging: Concept, Realization and First Prototype Measurements, IEEE Transactions on Nuclear Science vol. 54, No. 2, Apr. 2007.*

* cited by examiner

*Primary Examiner* — David Porta
*Assistant Examiner* — Meenakshi Sahu
(74) *Attorney, Agent, or Firm* — Cooper Legal Group, LLC (57) ABSTRACT

Among other things, one or more techniques and/or systems are described for counting detection events on a detector cell of a photon counting detector array. An electronics arrangement of the detector cell comprises a digital discriminator which is configured according to an impulse response of the detector cell or, more particularly, an impulse response of a radiation detection element of the detector cell (e.g., where the radiation detection element is configured to convert energy of the radiation photon into electrical charge). The digital discriminator is configured to analyze a digital representation of a voltage signal of the detector cell and to compare a result of the analysis to one or more metrics derived based upon the impulse response of the detector cell to identify voltage pulses of the voltage signal that are indicative of detection events.

20 Claims, 6 Drawing Sheets

NOISE DISCRIMINATION IN PHOTON COUNTING SYSTEM

BACKGROUND

The present application relates to the field of radiation imaging systems. It finds particular application to a data acquisition system of a photon counting system, where radiation photons impinging upon a photon counting detector array are counted and/or an energy of respective radiation photons is resolved via the data acquisition system.

Today, radiation imaging systems such as computed tomography (CT) systems, single-photon emission computed tomography (SPECT) systems, projection systems, and/or line-scan systems, for example, are useful to provide information, or images, of interior aspects of an object under examination. Generally, the object is exposed to radiation (e.g., x-ray photons, gamma photons, etc.), and an image(s) is formed based upon the radiation absorbed and/or attenuated by interior aspects of the object, or rather an amount of radiation that is able to pass through the object. Typically, highly dense aspects of the object absorb and/or attenuate more radiation than less dense aspects, and thus an aspect having a higher density, such as a bone or metal, for example, may be apparent when surrounded by less dense aspects, such as muscle or clothing.

Radiation imaging systems typically comprise a detector array having one or more detector cells. Respective detector cells are configured to indirectly convert or directly convert radiation photons impinging thereon into electrical charge which is used to generate an electrical signal. The detector cells are typically "energy integrating" or "photon counting" type detector cells (e.g., the radiation imaging system operates in energy integrating mode or photon counting mode).

Energy integrating type detector cells are configured to integrate the electrical charge generated over a period of time (e.g., at times referred to as a measurement interval) to generate an electrical signal that is proportional to an incoming radiation photon flux rate at a detector cell. Photon counting type detector cells are configured to generate an electrical signal (e.g., a voltage pulse) for respective radiation photons impinging thereon (e.g., where the impact of a radiation photon on a detector cell may be referred to as a detection event). In some embodiments, the electrical signal (e.g., or an amplitude of a voltage pulse) is indicative of an energy of the radiation photon.

While photon counting type detector cells offer advantages over energy integrating type detector cells in some applications, photon counting type detector cells are sensitive to noise. For example, noise introduced by electronics of the photon counting type detector cells may cause the number of detection events to be over counted and/or undercounted. Additionally, radiation photons may physically scatter upon interaction with a radiation detection element of a photon counting type detector cell, causing multiple energy deposits. If the photon counting type detector cell does not accurately reconcile these multiple energy deposits, respective energy deposits may be treated as a separate detection event (e.g., causing detection events to be over counted) and/or the energy of the detection event may not be accurately recorded.

SUMMARY

Aspects of the present application address the above matters, and others. According to one aspect an electronics arrangement of a photon counting detector array is provided. The electronics arrangement comprises an integration circuit configured to integrate charge generated by a detector cell of the photon counting detector array to generate a voltage signal, and a comparator configured to compare the voltage signal to a reference voltage to generate a digital output. The electronics arrangement also comprises a digital discriminator configured to analyze the digital output to identify a detection event on the detector cell.

According to another aspect, a method for counting detection events via a photon counting detector array is provided. The method comprises generating a voltage signal based upon electrical charge yielded from a detector cell of the photon counting detector array, and converting the voltage signal from an analog domain to a digital domain to generate a digital output. The method also comprises discriminating the digital output to identify a detection event based upon an impulse response of the detector cell.

According to yet another aspect a computer readable medium comprising processor executable instructions that when executed perform a method for counting detection events via a photon counting detector array is provided. The method comprises generating a voltage signal based upon electrical charge yielded from a detector cell of the photon counting detector array, and filtering, via an analog filter, the voltage signal to limit a noise bandwidth of the voltage signal. The method also comprises converting, after the filtering, the voltage signal from an analog domain to a digital domain to generate a digital output, and discriminating, via a digital discriminator, the digital output to identify a detection event.

Those of ordinary skill in the art will appreciate still other aspects of the present application upon reading and understanding the appended description.

FIGURES

The application is illustrated by way of example and not limitation in the figures of the accompanying drawings, in which like references generally indicate similar elements and in which.

DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

For purposes of the instant application, a signal may comprise a noise contribution and an information contribution. The noise contribution refers to an unwanted addition to the signal such as by electronics of the radiation imaging system. The information contribution refers to a contribution caused by a detection event. Voltage pulses in a voltage signal may be indicative of a noise contribution, an information contribution, or both.

Systems and/or techniques are described herein for discriminating, via a digital discriminator, an information contribution of a voltage signal generated by a detector cell of a photon counting detector array from a noise contribution. For example, the digital discriminator is configured to identify voltage pulses in the voltage signal that are likely indicative of detection events based upon a known impulse response of a detector cell to a detection event. For example, the digital discriminator may identify voltage pulses indicative of detection events based upon the length of time an amplitude of the voltage pulse exceeds a specified threshold (e.g., a specified voltage threshold). If the amplitude exceeds the specified threshold for a length of time that would be expected if a detection event occurred (e.g., based upon the known impulse response of the detector cell), the digital discriminator may determine that the voltage pulse is indicative of a detection event (e.g., and generate an output indicating that a detection event has been identified). If the length of time the amplitude exceeds the specified threshold is less than would be expected for a detection event, the digital discriminator may determine that the voltage pulse is indicative of a noise contribution.

The impulse response of a detector cell may be a function of a composition of a radiation detection element, a thickness of the radiation detection element, and/or an energy spectrum of emitted radiation. In some embodiments, one or more metrics utilized by the digital discriminator to identify detection events may change during an examination of an object and/or between examinations of objects. By way of example, as a radiation source is rotated from a side-view of a torso to a front-view of a torso, an average energy of emitted radiation photons may decrease from 50 keV to 30 keV (e.g., due to a decreased thickness of the torso when viewed from the front as opposed to the side), and thus one or more metrics utilized by the digital discriminator may change to account for the changing energy of emitted radiation photons (e.g., which may impact the impulse response of the detector cell).

Figure 1:
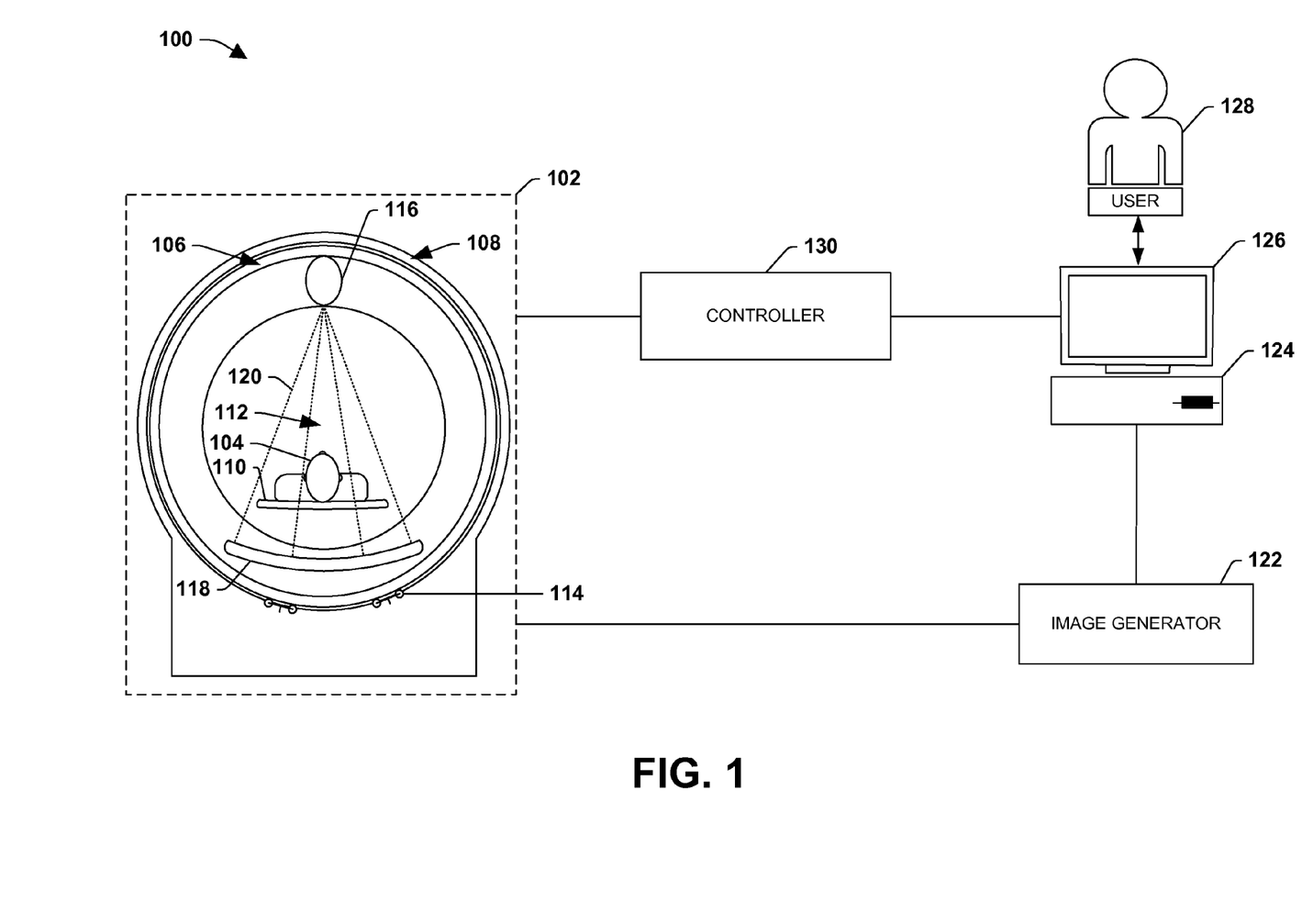
FIG. 1 illustrates an example environment of a radiation imaging system.

Referring to FIG. 1, a radiation imaging system 100 comprising an electronics arrangement (e.g., also referred to as a digital acquisition system (DAS)) including a digital discriminator according to some embodiments is illustrated. In the example embodiment, the radiation imaging system 100 is a computed tomography (CT) system, although the systems and/or techniques described herein may find applicability to other radiation imaging systems such as line-scan systems, mammography systems, and/or diffraction systems, for example. Moreover, it may be appreciated that the arrangement of features, inclusion of features and/or exclusion of other features from the example radiation imaging system 100 is not intended to be interpreted in a limiting manner, such as necessarily specifying the location, inclusion, and/or relative position of features.

The example radiation imaging system 100 comprises an examination unit 102 configured to examine objects 104. The examination unit 102 comprises a rotating gantry 106 and a stationary support structure 108 (e.g., which may encase and/or surround at least a portion of the rotating gantry 106 (e.g., as illustrated with an outer, stationary ring, surrounding an outside edge of an inner, rotating ring)). The examination unit 102 also comprises a support article 110, such as a bed or conveyor belt, configured to support the object 104 during an examination. In some embodiments, the support article 110 may be configured to translate the object into and/or through an examination region 112 (e.g., a hollow bore in the rotating gantry 106), where the object 104 is exposed to radiation 120, during the examination.

The rotating gantry 106 may surround a portion of the examination region 112 and may comprise a radiation source 116 (e.g., an ionizing radiation source such as an x-ray source or gamma-ray source) and a detector array 118. The detector array 118 is typically mounted on a substantially diametrically opposite side of the rotating gantry 106 relative to the radiation source 116, and during an examination of the object 104, the rotating gantry 106 (e.g., including the radiation source 116 and detector array 118) is rotated about the object 104 by a rotator 114 (e.g., belt, drive shaft, chain, roller truck, etc.). Because the radiation source 116 and the detector array 118 are mounted to the rotating gantry 106, a relative position between the detector array 118 and the radiation source 116 is substantially maintained during the rotation of the rotating gantry 106.

During the examination of the object 104, the radiation source 116 emits cone-beam, fan-beam, and/or other shaped radiation configurations from a focal spot of the radiation source 116 (e.g., a region within the radiation source 116 from which radiation 120 emanates) into the examination region 112. Such radiation 120 may be emitted substantially continuously and/or may be emitted intermittently (e.g., a brief pulse of radiation 120 is emitted followed by a resting period during which the radiation source 116 is not activated). Further, the radiation 120 may be emitted at a single energy spectrum or multi-energy spectrums depending upon, among other things, whether the radiation imaging system 100 is configured as a single-energy system or a multi-energy (e.g., dual-energy) system.

As the emitted radiation 120 traverses the object 104, the radiation 120 may be attenuated (e.g., absorbed and/or scattered) differently by different aspects of the object 104. Because different aspects attenuate different percentages of the radiation 120, the number of radiation photons detected by respective detector cells of the detector array 118 may vary. For example, detector cells that are shadowed by dense aspects of the object 104, such as a bone or metal plate, may detect fewer radiation photons (e.g., or a ratio between high energy radiation photons and low energy radiation photons may be higher) than detector cells that are shadowed by lower density aspects of the object 104, such as skin or clothing (e.g., which may allow an overall greater number of radiation photons to pass through and/or may allow a greater number of low energy radiation photons to pass through).

Respective detector cells of the detector array 118 may comprise a radiation detection element and an electronics arrangement. The radiation detection element is configured to indirectly convert and/or directly convert radiation photons into charge. The electronics arrangement is configured to convert the charge into a voltage signal and/or to process the voltage signal to determine a number of detection events that occurred and/or an energy spectrum (e.g., energy level or energy range) of respective detection events.

The radiation detection element generally comprises a conversion material and a thin-film transistor (TFT) array configured to detect/accumulate charge generated in response to a detection event. In a direct conversion detector array, the conversion material is configured to convert the radiation photons into electrical charge. Example conversion materials of a direct conversion detector array include, among other things, Cadmium Zinc Telluride, Cadmium Telluride, Silicon, and/or an amorphous material. In an indirect conversion detector array, the conversion material is configured to convert the radiation photons into light energy, and the radiation detection element further comprises a photodetector (e.g., a photodiode, such as a back-illuminated photodiode) configured to convert the light energy into electrical charge. Example conversion materials of an indirect conversion detector array (e.g., also referred to as a scintillator material) include, among other things, Cadmium Tungstate, Bismuth Germanate, Cesium Iodide, Sodium Iodide and/or Lutetium Orthosilicate.

The electronics arrangement of the detector array 118 is generally configured to convert the electrical charge into a voltage signal and/or to process the voltage signal to generate information about respective detection events. Such processing may include filtering, shaping, and/or digitizing the voltage signal, and the generated information may include a timestamp describing when a detection event occurred and/or an energy spectrum of the detection event, for example.

Information generated by the electronics arrangement of the detector array 118 may be transmitted to an image generator 122 configured to generate an image(s) of the object 104 using the information. Such images may depict a two dimensional representation of the object 104 and/or a three dimensional representation of the object 104, for example. In other embodiments, the information may be transmitted to other components for processing, such as to a threat analysis component.

The example environment 100 also includes a terminal 124, or workstation (e.g., a computer), configured to receive image(s) from the image generator 122, which can be displayed on a monitor 126 to a user 128 (e.g., security personnel, medical personnel, etc.). In this way, the user 128 can inspect the image(s) to identify areas of interest within the object(s) 104. The terminal 124 can also be configured to receive user input which can direct operations of the examination unit 102 (e.g., a speed of gantry rotation, an energy spectrum of the radiation, etc.).

In the example environment 100, a controller 130 is operably coupled to the terminal 124. The controller 130 may be configured to control operations of the examination unit 102, for example. By way of example, in some embodiments, the controller 130 may be configured to receive information from the terminal 124 and to issue instructions to the examination unit 102 indicative of the received information (e.g., adjust a speed of a conveyor belt, adjust a voltage applied to the radiation source 116, etc.).

Figure 2:
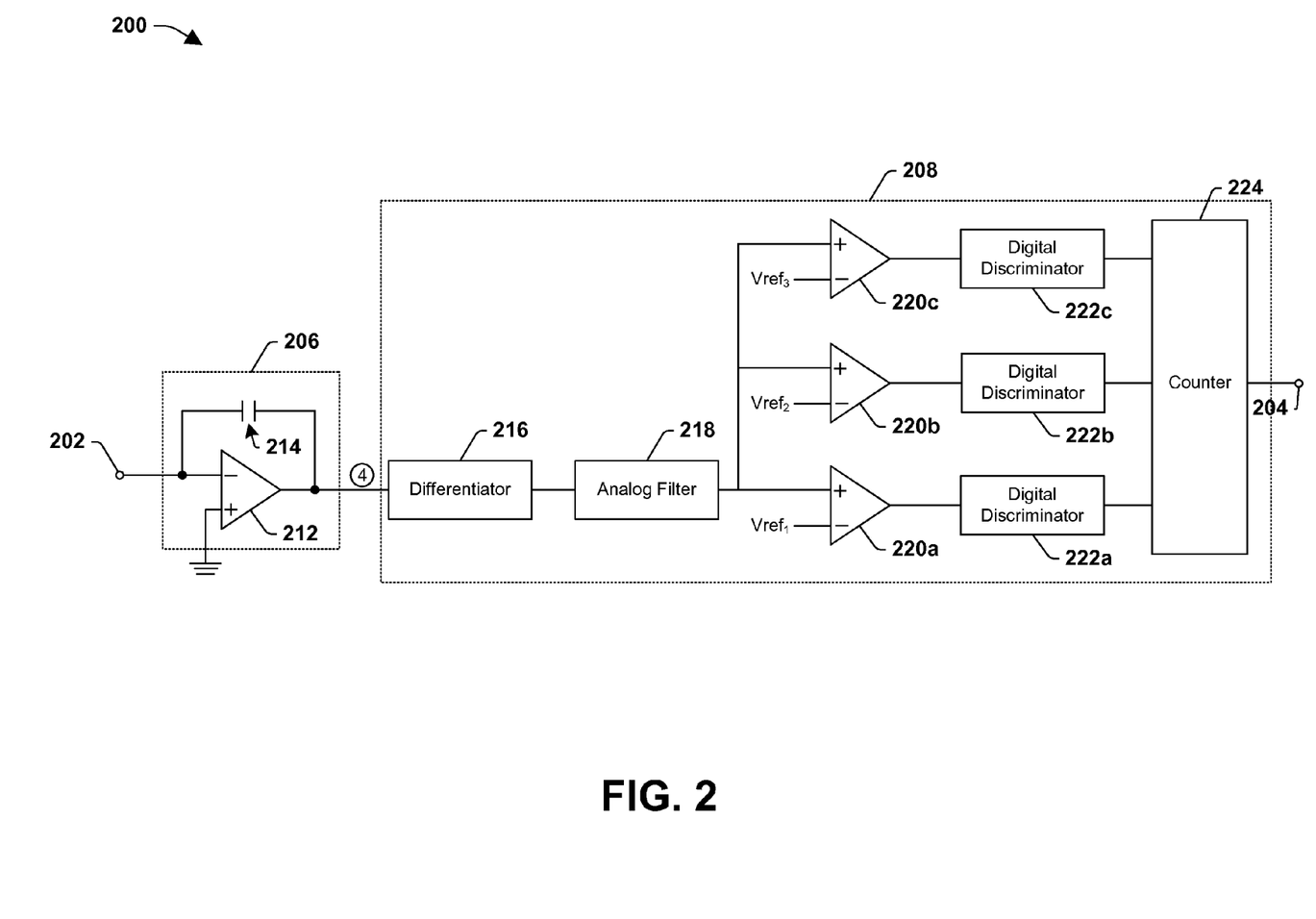
FIG. 2 illustrates a schematic diagram of an example electronics arrangement of a photon counting detector cell.

Referring to FIG. 2, a schematic diagram of an example electronics arrangement 200 of a detector cell of a photon counting detector array is illustrated. When a radiation photon impinges a radiation detection element of the detector cell (e.g., when a detection event occurs), charge is generated within the radiation detection element, which flows into the electronics arrangement 200 via a first terminal 202 operably coupled to the radiation detection element. The amount of charge generated is typically indicative of an energy level of the impinging radiation photon. The electronics arrangement 200 is configured to convert the charge into a voltage signal and/or to process the voltage signal to generate information about the detection event. Such information may include, among other things, when the detection event occurred and/or an energy spectrum of the impinging radiation photon. The information generated by the electronics arrangement may be output at a second terminal 204 operably coupled to an image generator (e.g., 122 in FIG. 1) and/or other component (e.g., a threat analysis component, object identification component, etc.), for example.

The electronics arrangement 200 comprises an integration circuit 206 and a signal processing circuit 208.

The integration circuit 206 (e.g., also referred to as a charge amplifier) is configured to convert the charge generated in response to a detection event into a voltage signal. In some embodiments, the integration circuit 206 comprises an operational-amplifier 212 (e.g., op-amp) and a capacitor 214 that are coupled in parallel to create a feedback loop. When a pulse of charge is applied to the op-amp 212, a voltage potential at an input side of the op-amp 212 increases and a voltage potential with an inverse polarity appears at the output side of the op-amp 212. The voltage potential at the output side of the op-amp 212 is fed through the feedback loop, causing the voltage potential at the input-side to return to zero (e.g., nearly instantaneously) and/or causing the charge to be integrated into a feedback capacitance of the capacitor 214. Such integration causes a voltage signal, in an analog domain, to be output from the integration circuit 206 that is substantially proportional to the charge received at the input terminal 202.

Although not illustrated, the integration circuit 206 may further comprise a reset mechanism configured to periodically and/or intermittently reset the integration circuit 206 and/or discharge charge stored in the capacitor 214 of the integration circuit 206. In some embodiments, such a reset mechanism may comprise a resistor and/or a switching element coupled in parallel with the capacitor 214. In other embodiments, the reset mechanism may comprise a charge source configured to inject charge into the integration circuit 206 that counteracts the stored charge, for example.

The signal processing circuit 208 is configured to process the voltage signal output by the integration circuit 206 to identify detection events at the detector cell and/or to identify an energy spectrum associated with respective detection events. In this way, a record of detection events experienced by the detector cell is generated. The signal processing circuit 208 comprises a differentiator 216, an analog filter 218, a set of one or more comparators 220, a set of one or more digital discriminators 222, and a counter 224.

The differentiator 216 is electrically coupled between the integration circuit 206 and the analog filter 218 and is configured to generate a second voltage signal that is proportional to a rate of change of the voltage signal output by the integration circuit 206. Thus, an amplitude of the second voltage signal may be greater when the voltage signal output by the integration circuit 206 experiences a fast rate of change (e.g., when the voltage drops from 1.5 V to 1 V in 2 ns) than when the voltage signal output by the integration circuit 206 experiences a slower rate of change (e.g., when the voltage drops from 1.5 V to 1 V in 5 ns), for example.

The analog filter 218 is electrically coupled between the differentiator 216 and the set of one or more comparators 220 and is configured to filter the second voltage signal to limit a noise bandwidth of the second voltage signal. That is, stated differently, the analog filter 218 is configured to filter voltage pulses from the second voltage signal that have a frequency characteristic that is outside of a specified frequency range. By way of example, in some embodiments, the analog filter 218 comprises a wide band-pass filter configured to inhibit voltage pulses having a frequency characteristic below a first frequency threshold or having a frequency characteristic above a second frequency threshold from passing through the analog filter 218 (e.g., where the first frequency threshold and the second frequency threshold may define a lower boundary and an upper boundary of the specified frequency range). The first frequency threshold may be set to a value that is less than a lower frequency limit of an information contribution and the second frequency threshold may be set to a value that is greater than a high frequency limit of an information contribution (e.g., to mitigate voltage pulses that may be indicative of an information contribution from being filtered). Thus, merely voltage pulses indicative of a noise contribution may be filtered by the analog filter 218, for example.

In some embodiments, the analog filter 218 is configured to not filter and/or not shape voltage pulses potentially indicative of an information contribution. By way of example, a full width at half maximum (FWHM) of the analog filter 218 may be less than an FWHM of an impulse response of the detector cell, or more particularly, of the radiation detection element. In this way, voltage pulses that are potentially representative of an information contribution are not shaped while voltage pulses that are merely representative of a noise contribution (e.g., which may have a pulse width that is less than a pulse width of voltage pulses representative of a detection event) may be shaped and/or filtered, for example.

A set of one or more comparators 220 is electrically coupled between the analog filter 218 and the set of one or more digital discriminators 222 and is configured to convert the second voltage signal (e.g., or the portion of the second voltage signal passing through the analog filter 218) from an analog domain to a digital domain. More particularly, the set of one or more comparators 220 is configured to compare the second voltage signal to a set of one or more reference voltages to generate a digital output indicative of a result of the comparison. By way of example, a first comparator 220a may be configured to compare the second voltage signal to a first reference voltage, such as 0.5 V, and generate a digital output indicative of a result of the comparison. As an example, the first comparator 220a may output a first digital output (e.g., a High voltage) when an amplitude of the second voltage signal is greater than the first reference voltage, and may output a second digital output (e.g., a Low voltage) when an amplitude of the second voltage signal is less than or equal to the first reference voltage. The second comparator 220b and the third comparator 220c may perform functions similar to the first comparator 220a but compare the second voltage signal to different reference voltages. For example, the second comparator 220b may compare the second voltage signal to a second reference voltage, such as 0.7 V, and the third comparator 220c may compare the second voltage signal to a third reference voltage, such as 0.9 V.

In some embodiments, respective comparators 220 of the set are selected to have little to no hysteresis. That is, stated differently, the comparators 220 are selected to have little to no lag-time (e.g., to wait and see how the voltage signal behaves). Thus, the first comparator 220a is configured to switch from a first digital output to a second reference voltage nearly instantaneously upon the amplitude of the second voltage signal decreasing to a level equal to or less than the first reference voltage (e.g., instead of waiting to see if the amplitude bounces back to a level above the first reference voltage) and/or vice-versa, for example.

In some embodiments, the set of comparators comprises at least three comparators 220 to facilitate distinguishing fluorescent events from non-fluorescent events (e.g., where a fluorescent event corresponds to an (undesirable) emission of secondary radiation from the radiation detection element). For example, a first comparator 220a of the set may be configured to compare the second voltage signal to a first reference voltage corresponding to a minimum energy level of a detection event, a second comparator 220b of the set may be configured to compare the second voltage signal to a second reference voltage corresponding to an energy level slightly lower than a characteristic fluorescent energy, and a third comparator 220c of the set may be configured to compare the second voltage signal to a third reference voltage corresponding to an energy level slightly higher than a characteristic fluorescent energy. If a voltage pulse of the second voltage signal triggers merely the first comparator 220a (e.g., where a comparator 220 "triggers" when a voltage pulse exceeds the reference voltage to which the comparator 220 is comparing the voltage pulse) or triggers all three comparators 220a, 220b, and 220c, the voltage pulse is indicative of a non-fluorescent event (e.g., unless it is determined by a digital discriminator 222 that the voltage pulse is merely indicative of a noise contribution). If a voltage pulse triggers the first comparator 220a and the second comparator 220b, but not the third comparator 220c, the voltage pulse is indicative of a fluorescent event (e.g., unless it is determined by a digital discriminator 222 that the voltage pulse is merely indicative of a noise contribution) and should not be counted as a detection event, for example.

In some embodiments, the characteristic fluorescent energy is a function of a composition of a radiation detection element of the detector cell. Thus, the first reference voltage, the second reference voltage, and/or the third reference voltage may be determined based upon the composition of the radiation detection element, for example.

In some embodiments, additional comparators 220 may be added to the set to provide for additional energy discrimination of a radiation photon. By way of example, it may be of interest to determine whether the detection event is at least a 70 keV non-fluorescent event. Accordingly, a fourth comparator may be added to the set to compare the second voltage signal to a fourth reference voltage corresponding to an energy level slightly under 70 keV and a fifth comparator maybe added to the set to compare the second voltage signal to a reference voltage corresponding to a difference between 70 keV and the characteristic fluorescent energy.

A set of digital discriminators 222 is configured to use the digital output of respective comparators 220 to identify detection events on the detector cell. That is, stated differently, respective digital discriminators 222 are configured to determine whether a pulse in a digital output corresponds to a detection event on the detector cell, corresponds to multiple detection events, or corresponds merely to a pulse of noise in the analog voltage signal. In some embodiments, respective digital discriminators 222 are configured to receive the digital output of a respective comparator 220 (e.g., such that there is a one-to-one ratio between comparators 220 and digital discriminators 222). For example, in the illustrated embodiment, a first digital discriminator 222a is configured to receive the digital output of the first comparator 220a, a second digital discriminator 222b is configured to receive the digital output of the second comparator 220b, and a third digital discriminator 222c is configured to receive the digital output of the third comparator 220c.

Respective digital discriminators 222 are configured to analyze the digital output of a corresponding comparator 220 to determine whether a pulse in the digital output (e.g., corresponding to a pulse in the second voltage signal) corresponds to a detection event, corresponds to multiple detection events, or corresponds to merely a noise contribution. More particularly, the digital discriminators 222 are configured to respectively compare results of the analysis to one or more metrics which have been programmed into the digital discriminators 222.

The metrics to which the results of the analysis are compared are derived from an impulse response of the detection cell or, more particularly, an impulse response of a radiation detection element. By way of example, when a detection event occurs, the radiation detection element may respond in a particular manner. For example, the radiation detection element may generate charge at a particular (e.g., known) rate in response to a radiation photon impacting the radiation detection element. Accordingly, a voltage pulse generated based upon the charge may have particular characteristics which can be used to determine one or more metrics against which results of the analysis are compared. For example, an amplitude of a voltage pulse corresponding to a detection event may exceed a specified voltage threshold for a specified time threshold (e.g., where a comparator 220 operably coupled to a digital discriminator 222 is configured to compare the voltage pulse or voltage signal to a reference voltage corresponding to the specified voltage threshold). If the digital output indicates that the amplitude of the voltage pulse exceeded the specified voltage threshold for at least the specified time threshold, the digital discriminator 222 may identify the voltage pulse as corresponding to a detection event and generate an output indicating the identification of a detection event. If the digital output indicates that the amplitude of the voltage pulse exceeded the specified voltage threshold for less than the specified time threshold, the digital discriminator 222 may identify the voltage pulse as corresponding to noise and output an output indicating that no detection event was identified. If the digital output indicates that the amplitude of the voltage pulse exceeded the specified voltage threshold for longer than what would be expected for a single detection event, the digital discriminator 222 may identify the voltage pulse as corresponding to multiple detection events (e.g., where the number of events may be based on a length of time the voltage pulse exceeds the specified threshold) and generate an output indicating the identification of multiple detection events. It may be appreciated that other metrics which may be derived from the impulse response of the detection cell are further described below and may be compared to the results of the analysis to identify detection events based upon the digital output(s) of one or more comparators 220. By way of example, a weighted time threshold may be used and/or a low pass filter time above a threshold may be used.

In some embodiment, one or more digital discriminators 222 may be in operable communication with one or more other digital discriminators 222 of the detector cell. By way of example, the first digital discriminator 222a may be in operable communication with the second digital discriminator 222b and/or the third digital discriminator 222c. In this way, the first digital discriminator 222a may share the results of an analysis performed by the first digital discriminator 222a with the second digital discriminator 222b and/or the third digital discriminator 222c and/or vice-versa. By way of example, when a high energy detection event occurs, multiple digital discriminators 222 may identify a detection event (e.g., where the first digital discriminator 222a is configured to determine if a voltage pulse corresponding to the detection event remained above a first voltage threshold for a first specified time threshold, the second digital discriminator 222b is configured to determine if the voltage pulse remained above a second voltage threshold for a second time threshold, etc.). In some embodiments, it may be desirable for an identification of the detection event to be represented in the output of merely one digital discriminator 222. Accordingly, the multiple digital discriminators 222 may communicate results between one another to inhibit multiple digital discriminators 222 from generating an output indicative of an identification of a same detection event. For example, in some embodiments, the digital discriminators 222 may be programmed to provide that merely the most elevated digital discriminator that identified a detection event (e.g., the digital discriminator corresponding to the highest voltage threshold that identified the detection event) is to generate an output indicative of an identification of the detection event.

In some embodiments, one or more digital discriminators 222 of a detector cell may be in operable communication with one or more neighboring digital discriminators of a neighboring detector cell. By way of example, when a radiation photon impinges an area of a detector cell adjacent a neighboring detector cell, both the detector cell and the neighboring detector cell may generate charge (e.g., causing both the detector cell and the neighboring detector cell to generate a voltage pulse corresponding to the detection event). Accordingly, one or more digital discriminators 222 of the detector cell may communicate with one or more neighboring digital discriminators of the neighboring detector cell to identify instances where it is likely that the detector cell and the neighboring detector cell have identified a same detection event. By way of example, in some embodiments, if one or more digital discriminators 222 of the detector cell and one or more neighboring digital discriminators of the neighboring detector cell concurrently identify detection events, it may be presumed that the concurrently identified detection events correspond to a single detection event. Accordingly, in some embodiments, the digital discriminator(s) 222 of the detector cell and one or more neighboring digital discriminators of the neighboring detector cell may be programmed to resolve the concurrent identifications. By way of example, the digital discriminators 222 and neighboring digital discriminators may be programmed to provide that the detection event is to be recorded by whichever detector cell identified the highest energy detection event. Accordingly, digital discriminators of the detector cell(s) that detected a lower energy detection event may be programmed to generate an output indicating that no detection event occurred while the digital discriminator(s) of the detector cell that detected the highest energy detection event may be programmed to generate an output indicative of the detection event.

The output of respective digital discriminators 222 is provided to a counter 224 configured to tabulate and/or record the results of the comparisons by respective digital discriminators 222. By way of example, the counter 224 may comprise a database of detection events. When a new detection event is identified by the digital discriminators 222, the counter 224 may create a new entry in the database, where the new entry may comprise a timestamp corresponding to the new detection event and an energy spectrum associated with the detection event (e.g., approximate energy level of the detected radiation photon). Periodically, intermittently, and/or on demand, the counter 224 may be configured to output at least a portion of the database via the second terminal 204.

Figure 3:
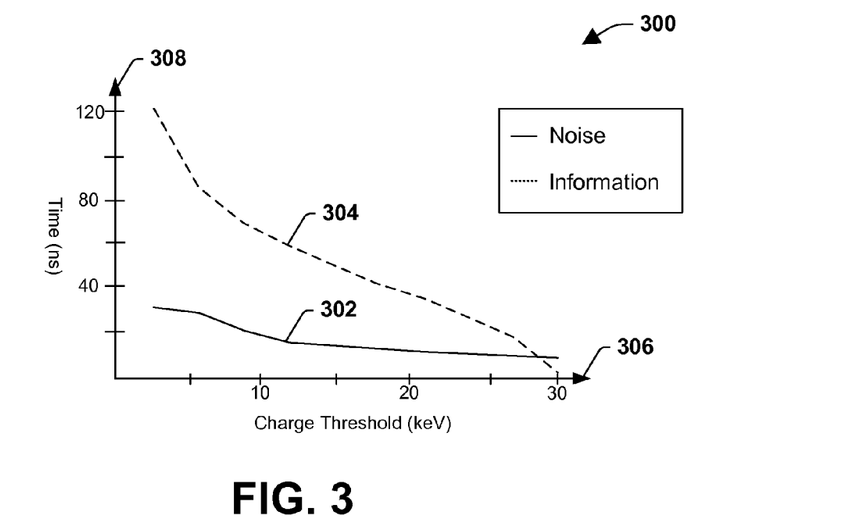
FIG. 3 illustrates an example graph describing an amount of time a noise contribution remains above a threshold in relation to an amount of time an information contribution remains above the threshold.

Referring to FIG. 3, a graph 300 describing the amount of time a noise contribution 302 remains above a threshold in relation to the amount of time an information contribution 304 remains above the threshold is illustrated. The typical noise contribution 302 to a signal generated by the detector cell is represented by the solid line and the information contribution 304 to the signal (e.g., representative of a detection event) is represented by the dashed line. For purposes of this example, the detector cell comprises a cadmium zinc telluride radiation detection element and the information contribution 304 is representative of a typical response to a 30 keV detection event. It may be appreciated that the timings of the noise contribution and/or information contribution 304 may vary based upon a composition of the radiation detection element, a thickness of the radiation detection element, and/or an energy spectrum of emitted radiation photons.

The x-axis 306 of the graph 300 represents various energy thresholds and the y-axis represents an average amount of time that a contribution remains above the energy threshold (e.g., referred to as a crossing time). By way of example, a voltage pulse indicative merely of an information contribution 304 (e.g., indicative of a detection event) typically has an amplitude corresponding to an energy of at least 10 keV for about 60 nanoseconds (ns) whereas a voltage pulse indicative merely of a noise contribution 302 typically has an amplitude corresponding to an energy of at least 10 keV for less than 20 ns. The energy thresholds may be translated into voltage thresholds for purposes of analysis by a signal processing circuit (e.g., 208 in FIG. 2) of the detector cell.

Based upon the behavior of the detector cell in response to a detection event (e.g., based upon the impulse response of the detector cell), a voltage threshold for a comparator (e.g., 220 in FIG. 2) and/or a metric(s) against which results of an analysis of the digital output of the comparator may be compared by a digital discriminator (e.g., 222 in FIG. 2) may be determined. By way of example, referring to the graph 300, a noise contribution 302 may be virtually indistinguishable, in terms of crossing time, from an information contribution 304 at voltage thresholds corresponding to energies of about 28 keV and higher. Accordingly, a voltage threshold associated with a comparator may be selected to correspond to an energy level of 26 keV or less, where the information contribution 304 is more distinguishable from the noise contribution 302 based upon crossing time. By way of example, the voltage threshold associated with a comparator may be set to correspond to 20 keV and a digital discriminator operably coupled to the comparator may be configured to determine if a voltage pulse effectively exceeds the voltage threshold for at least 30 ns. If the results of the analysis of the digital output of the comparator reveal that a voltage pulse did not have an amplitude exceeding the voltage threshold for at least 30 ns, the digital discriminator may generate an output indicating that the voltage pulse did not correspond to a detection event. If the results of the analysis of the digital output of the comparator reveal that a voltage pulse had an amplitude exceeding the voltage threshold for at least 30 ns, the digital discriminator may generate an input indicating that the voltage pulse corresponded to a detection event.

It may be appreciated that the energy of radiation photons impingent upon a detector cell may differ because radiation photons may interact with an object differently and/or may have a different energy when emitted from the radiation source. For example, a first radiation photon may have 30 keV of energy upon impact with the radiation detection element of a detector cell and a second radiation photon may have 40 keV of energy upon impact with the radiation detection element. In some embodiments, it may be desirable to discriminate 30 keV events from 40 keV events. Accordingly, an electronics arrangement of the detector cell, or a signal processing circuit thereof, may be configured to discriminate 30 keV events from 40 keV events based upon differences between an impulse response of a 30 keV event and an impulse response of a 40 keV event.

Figure 4:
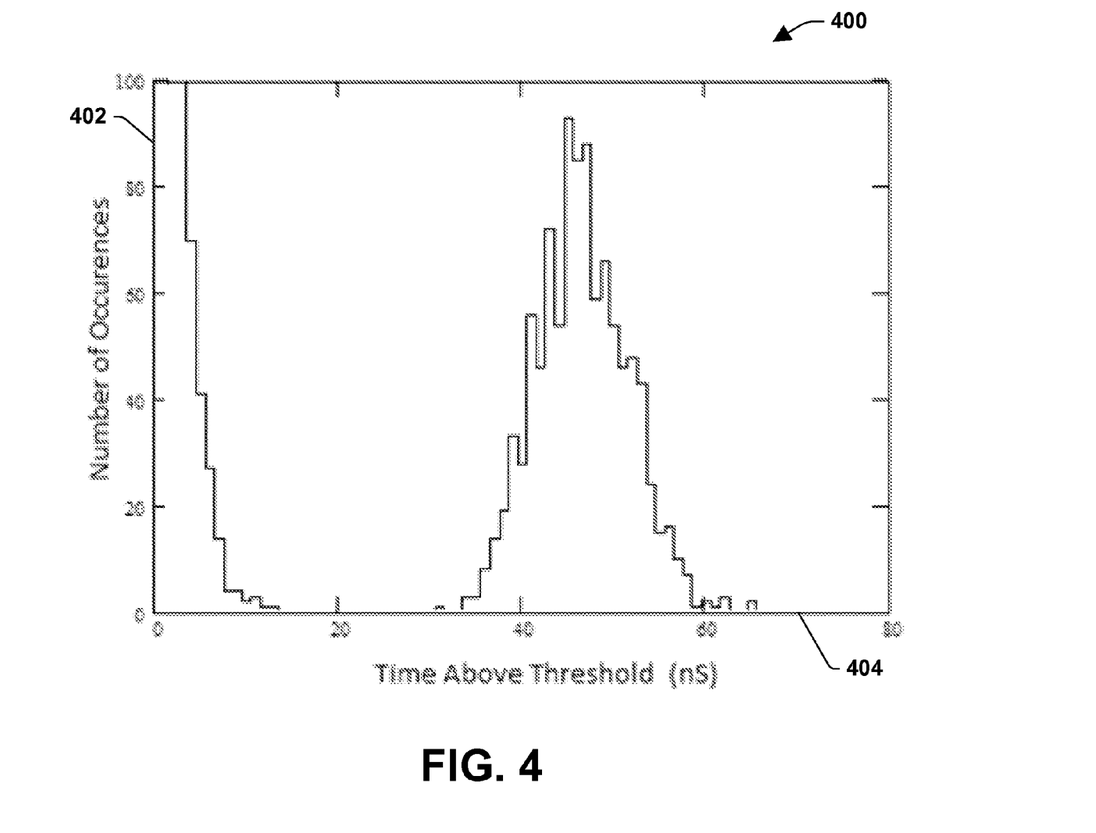
FIG. 4 illustrates a histogram of time above threshold for noise contribution and information contribution given a fixed comparator charge threshold and certain front end electronic noise.

Referring to FIG. 4, a histogram 400 of time above threshold for noise contribution and information contribution given a fixed comparator charge threshold and certain front end electronic noise is illustrated. That is, stated differently, the histogram 400 plots the number of voltage pulses (e.g., number of occurrences) in relation to the time respective voltage pulses remain above a voltage threshold. The y-axis 402 represents number of occurrences (e.g., number of voltage signals) and the x-axis 404 represents the time a voltage signal remained above the voltage threshold. By way of example, a timing threshold may be set to correspond to a threshold of approximately 20 keV. Referring to the graph 400, the number of voltage pulses that remained above the timing threshold for 40 nS is approximately 35.

As illustrated in FIG. 3 and further evident from FIG. 4, voltage pulses indicative of a noise contribution typically remain above the voltage threshold for less than 20 nS whereas voltage pulses indicative of an information contribution typically remain above the voltage threshold for more than 20 nS for a certain charge threshold and front end electronic noise. Moreover, as shown in the distribution, there is a clear delineation in the distribution between voltage pulses indicative of a noise contribution (e.g., to the left of a 20 nS threshold) and voltage pulses indicative of an information contribution (e.g., to the right of the 20 nS threshold). Thus, according to the distribution, a digital discriminator may be configured to discriminate information contributions from noise contributions based upon whether the voltage pulse exceeds the voltage threshold for less than 20 nS or more than 20 nS.

Figure 5:
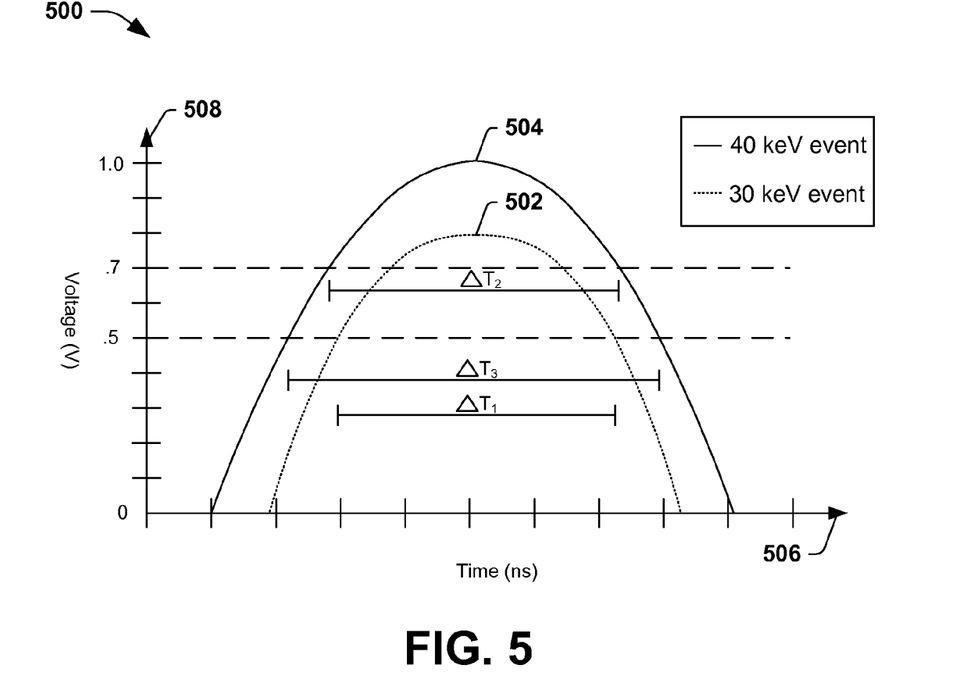
FIG. 5 illustrates an example impulse response of a detector cell to a 30 keV detection event and a 40 keV detection event.

Referring to FIG. 5, a graph 500 describing an impulse response 502 of a detector cell to a 30 keV event and an impulse response 504 of the detector cell to a 40 keV event is illustrated. For purposes of this example, the charge has been translated into a voltage. Further, the x-axis 506 represents time and the y-axis 508 represents voltage.

As illustrated in the graph 500, the impulse response 502 of a detector cell to a 30 keV event is different than the impulse response 504 of the detector cell to a 40 keV event, and thus one or more comparators and/or digital discriminators may be programmed to distinguish 30 keV events from 40 keV events. By way of example, a first comparator (e.g., 220a in FIG. 2) may be configured to compare a voltage pulse in a voltage signal to a first reference voltage, such as 0.5 V, and a first digital discriminator (e.g., 222a in FIG. 2) may be configured to analyze a digital output of the first comparator to determine if the voltage pulse exceeds the first reference voltage for a period of time equal to at least $\Delta T_1$. If the voltage pulse exceeds the first reference voltage for a period of time equal to at least $\Delta T_1$, a detection event of at least 30 keV is identified. Further a second comparator (e.g., 220b in FIG. 2) may be configured to compare the voltage pulse to a second reference voltage, such as 0.7 V, and a second digital discriminator (e.g., 222b in FIG. 2) may be configured to analyze a digital output of the second comparator to determine if the voltage pulse exceeds the second reference voltage for a period of time equal to at least $\Delta T_2$. If the voltage pulse exceeds the second reference voltage for a period of time equal to at least $\Delta T_2$, a detection event of at least 40 keV is identified. In this way, using two comparators and two digital discriminators, detection events having an energy level between 30 keV and 40 keV can be distinguished from detection events having an energy level of at least 40 keV, for example.

As still another example, 30 keV detection events can be distinguished from 40 keV detection events using merely one comparator and one digital discriminator. By way of example, the first digital discriminator may be further configured to analyze the digital output of the first comparator to determine if the voltage pulse exceeds the first reference voltage for a period of time equal to at least $\Delta T_3$. If the voltage pulse exceeds the first reference voltage for a period of time equal to at least $\Delta T_3$, the voltage pulse is indicative of at least a 40 keV detection event. If the voltage pulse exceeds the first reference voltage for a period of time equal to at least $\Delta T_1$ but less than $\Delta T_3$, the voltage pulse is indicative of a detection event having an energy level between 30 keV and 40 keV.

Figure 6:
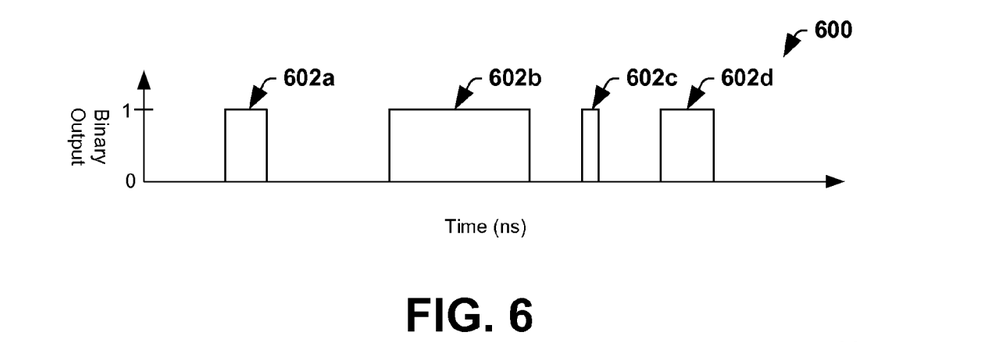
FIG. 6 illustrates a digital output of a comparator of an example electronics arrangement of a photon counting detector cell.

Referring to FIG. 6, a graph 600 describing an example digital output (e.g., binary output) of a comparator (e.g., 220 in FIG. 2) is provided. The comparator is configured to output a "1" when an amplitude of the voltage signal applied to the comparator exceeds a reference voltage applied to the comparator and is configured to output a "0" when the amplitude does not exceed the reference voltage.

In some embodiments, a digital discriminator (e.g., 222 in FIG. 2) is configured to analyze the digital output to determine a period during which the digital output is "1" (e.g., and thus the period of time that the voltage pulse exceeds the reference voltage). If the period exceeds a specified time threshold (e.g., $\Delta T_1$ in FIG. 5), the digital output may determine that the voltage pulse is indicative of a detection event and generate an output which identifies, to a counter (e.g., 224 in FIG. 2), that a detection event has been identified. If the period of time does not exceed the specified time threshold, the digital output may determine that the voltage pulse is merely indicative of noise and generate an output indicating that no detection event has been identified. By way of example, with reference to FIG. 6, the digital discriminator may determine that the duration of a first pulse 602a, a third pulse 602c, and a fourth pulse 602d in the digital output is insufficient to be indicative of a detection event. However, the digital discriminator may determine that the duration of a second pulse 602b in the digital output is sufficiently long to be indicative of a detection event and thus may generate an output indicating that a detection event has been identified from the second pulse 602b.

In some embodiments, a voltage pulse may be indicative of both a noise contribution and an information contribution to the voltage signal. Accordingly, the noise contribution may alter an expected behavior of an information contribution. By way of example, the noise contribution may cause an amplitude of a voltage pulse indicative of a detection event to drop below voltage threshold for a period of time. Therefore, if the digital discriminator is configured to identify detection events based upon the amount of time a voltage pulse continuously exceeds a voltage threshold, the noise contribution may cause to a voltage pulse indicative of a detection event to not be identified by the digital discriminator.

Figure 7:
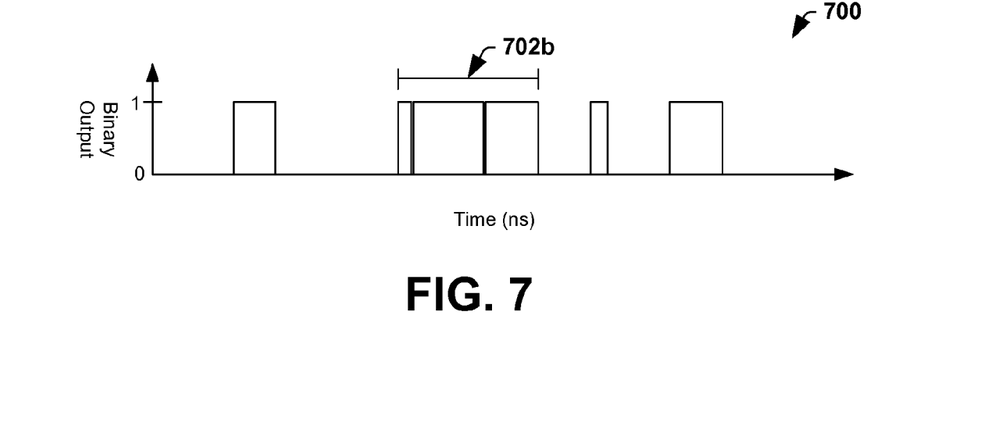
FIG. 7 illustrates a digital output of a comparator of an example electronics arrangement of a photon counting detector cell.

Referring to FIG. 7, a graph 700 describing an example digital output of a comparator is provided wherein a noise contribution to a voltage pulse indicative of a detection event causes an amplitude of the voltage pulse to, at times, drop below a reference voltage applied to a comparator. Accordingly, the comparator outputs a "0" at times when the comparator would be expected to output a "1" if the voltage pulse is indicative of a detection event. By way of example, the comparator may be expected to continuously output a "1" during the period labeled 702b if a voltage pulse is indicative of a detection event.

If the digital discriminator were configured to identify detection events based upon the length of time that the digital output is continuously "1," the digital discriminator may not identify a detection event during the period labeled 702b because the digital output drops to "0" twice during the period due to a noise contribution. Accordingly, other techniques may be used to substitute for and/or supplement the timing technique describe above for identifying detection events. By way of example, in another embodiment, the digital discriminator may comprise a pulse counter configured to be incremented when the digital output is "1" during a clock cycle (e.g., at the rising edge of a clock signal or at a falling edge of the clock cycle) and to be decremented when the digital output is "0" during a clock cycle (e.g., during a subsequent clock cycle). When the pulse counter exceeds a specified count, the digital discriminator may generate an output indicating that a detection event has been identified and reset the pulse counter to zero, for example. It may be appreciated that such a counting technique may be less sensitive to noise variation relative to the timing technique because small variations in the digital output (e.g., when the digital output drops to "0" for a small number of counts) may not interfere with the digital discriminator's ability to identify detection events. By way of example, over the course of the period labeled 702b, the number of clock cycles during which the digital output is "1" may exceed the specified count and thus the digital discriminator may generate an output indicating that a detection event has been identified (e.g., regardless of a couple of instances where the pulse counter is decremented). As another example, if over the course of the period labeled 702b, the number of clock cycles during which the digital output is "1" exceeds a second specified count (e.g., describing the maximum number of counts expected for a single detection event), the digital discriminator may generate an output indicating that at least two detection events have been identified.

Figure 8:
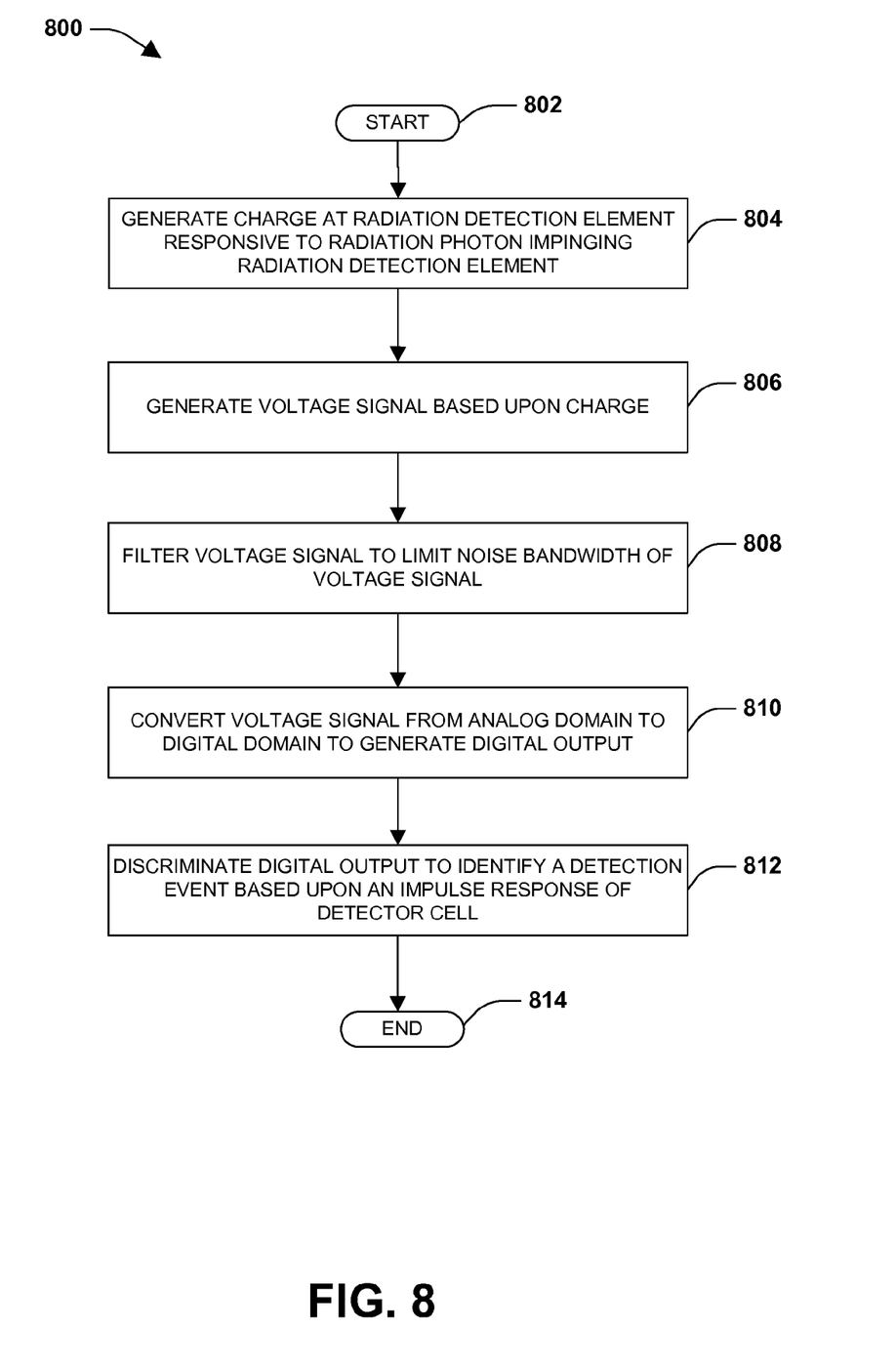
FIG. 8 is an example flow diagram illustrating an example method for counting detection events via a photon counting detector array.

Referring to FIG. 8, a flow diagram of an example method 800 for counting detection events via a photon counting detector array is provided. The example method 800 starts at 802, and charge is generated at a radiation detection element of a detector cell of the photon counting detector array responsive to a radiation photon impinging the radiation detection element at 804. The amount of charge generated is typically proportional to an energy of the radiation photon.

At 806, a voltage signal, in an analog domain, is generated based upon the charge yielded from the radiation detection element of the photon counting detector array. By way of example, in some embodiments, the charge is integrated into a capacitor of an integration circuit and a voltage signal is generated, or rather a voltage pulse is generated in a voltage signal, in response to the integration of the charge into the capacitor. An amplitude of the voltage pulse is typically proportional to the amount of charge integrated into the capacitor, which is proportional to the energy of the radiation photon. Accordingly, the amplitude of the voltage pulse is typically indicative of the energy of the radiation photon.

At 808 in the example method 800, the voltage signal is filtered via an analog filter to limit a noise bandwidth of the voltage signal. By way of example, the voltage signal may be applied to a wide band-pass filter configured to filter frequencies that are merely generated by a noise contribution to the voltage signal. In some embodiments, a full width at half maximum (FHWM) of the analog filter is set to be less than a FWHM of the impulse response of the detector cell, or more particularly of the radiation detection element of the detector cell, to inhibit voltage pulses indicative of a detection event from being shaped or filtered out by the analog filter, for example.

At 810 in the example method 800, the voltage signal is converted from an analog domain to a digital domain to generate a digital output. By way of example, in some embodiments, the voltage signal is applied to a set of one or more comparators configured to compare the voltage signal to one or more reference voltages. For example, a first comparator may be configured to compare the voltage signal to a first reference voltage, a second comparator may be configured to compare the voltage signal to a second reference voltage, etc. Respective comparators may generate a digital output indicative of a result of the comparison.

The reference voltage(s) to which the voltage signal is compared may be determined as a function of an impulse response of the detector cell and/or an energy spectrum of emitted radiation. By way of example, in some embodiments, it may be desirable to distinguish fluorescent events from non-fluorescent events. Thus, the reference voltages may be selected based upon the charge(s) generated in response to a fluorescent event and/or the charge(s) generated in response to a non-fluorescent event. As another example, it may be desirable to distinguish detection events corresponding to radiation photons respectively having an energy level within a first energy spectrum from detection events corresponding to radiation photons respectively having an energy level within a second energy spectrum. Accordingly, a first reference voltage may be selected to correspond to a low energy threshold of the first energy spectrum, a second reference voltage may be selected to correspond to a high energy threshold of the first energy spectrum, a third reference voltage may be selected to correspond to a low energy threshold of the second energy spectrum, and/or a fourth reference voltage may be selected to correspond to a high energy threshold of the second energy spectrum, for example.

At 812 in the example method 800, the digital output of respective comparators is discriminated via a digital discriminator to identify a detection event based upon an impulse response of the detector cell. That is, stated differently, the digital discriminator(s) is configured to analyze the digital output of one or more comparators and compare a result of the analysis to one or more metrics, which are defined based upon the impulse response of the detector cell. By way of example, in some embodiments, the discriminating comprises determining a period of time during which the digital output corresponds to a particular value (e.g., "1") (e.g., which corresponds to the voltage signal exceeding a specified reference voltage to which the voltage signal is compared by a comparator). If the period of time exceeds a specified time threshold, as determined based upon the impulse response of the detector cell, the digital discriminator determines that a detection event has occurred and generates an output indicative of the determination. As another example, the discriminating may comprise incrementing a pulse counter when the digital output corresponds to a particular value (e.g., when the voltage signal exceeds a specified reference voltage) during a clock cycle and decrementing a pulse counter when the digital output does not correspond to the particular value (e.g., when the voltage signal does not exceed the specified reference voltage) during a clock cycle. If the pulse counter exceeds a specified count, as defined based upon the impulse response of the detector cell, the digital discriminator determines that a detection event has occurred and generates an output indicative of the determination. In still other embodiments, other techniques are contemplated for identifying detection events based upon the digital output of one or more comparators.

In some embodiments, prior to comparing the results of the analysis to one or more metrics, an impulse response of the detector cell is determined. The impulse response of the detector cell may be determined using computer simulations and/or during testing in a lab environment (e.g., where radiation photons of a known energy are impingent upon the detector cell) and may be a function of, among other things, a composition of the radiation detection element of the detector cell, a thickness of the radiation detection element, and/or an energy spectrum of radiation emitted from a radiation source configured to expose the photon counting detector array to radiation.

The example method 800 ends at 814 when information about an identified detection event is conveyed from one or more digital discriminators to a counter configured to record the information.

Figure 9:
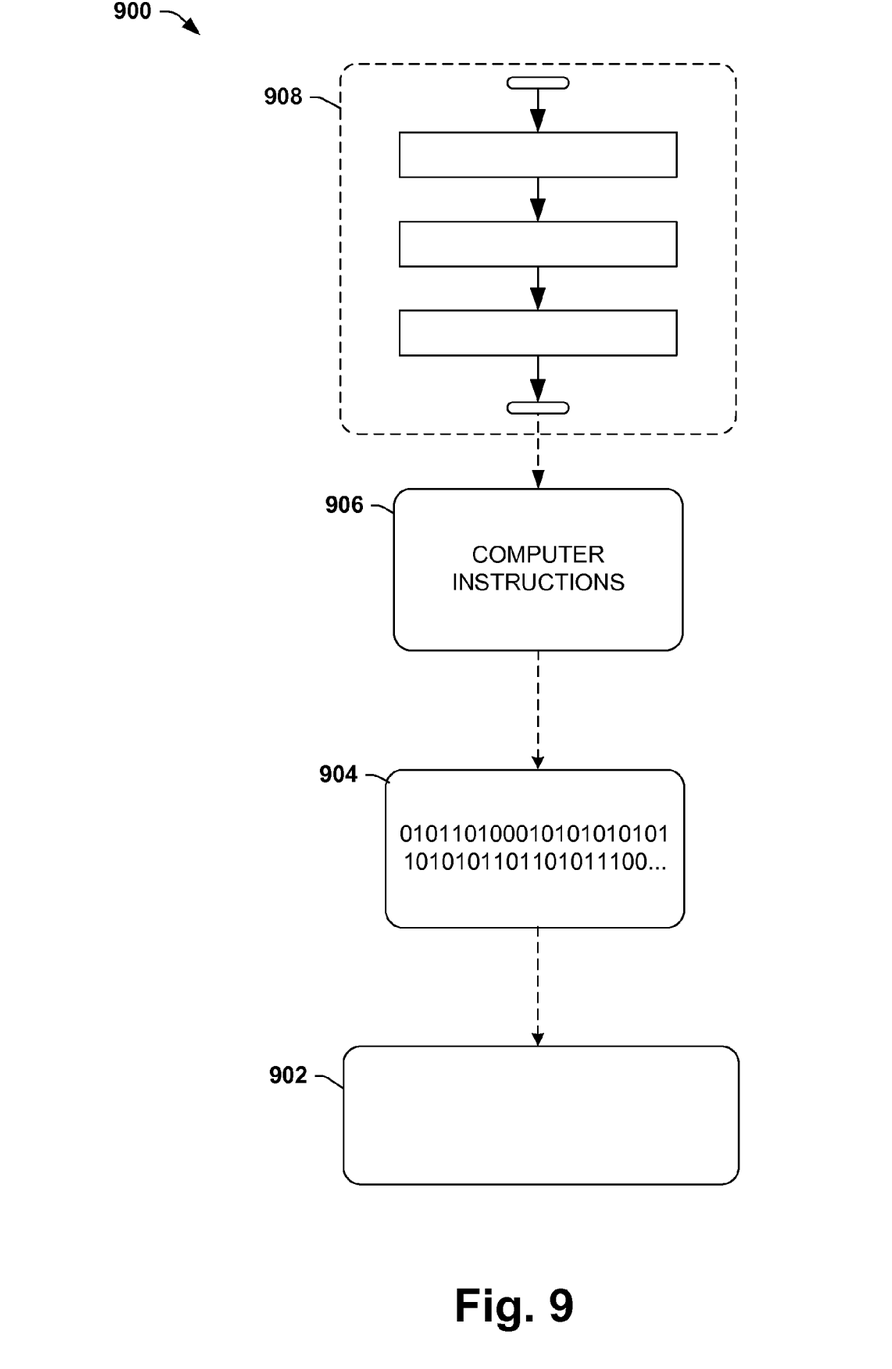
FIG. 9 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 9, wherein the implementation 900 comprises a computer-readable medium 902 (e.g., a flash drive, CD-R, DVD-R, application-specific integrated circuit (ASIC), field-programmable gate array (FPGA), a platter of a hard disk drive, etc.), on which is encoded computer-readable data 904. This computer-readable data 904 in turn comprises a set of processor-executable instructions 906 configured to operate according to one or more of the principles set forth herein. In one such embodiment 900, the processor-executable instructions 906 may be configured to perform a method 908 when executed via a processing unit, such as at least some of the example method 800 of FIG. 8. In another such embodiment, the processor-executable instructions 906 may be configured to implement a system, such as at least some of the example system 100 of FIG. 1 and/or at least some of the example electronics arrangement 200 of FIG. 2. Many such computer-readable media may be devised by those of ordinary skill in the art that are configured to operate in accordance with one or more of the techniques presented herein. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to structural features or methodological acts, it is to be understood that the subject matter of the appended claims is not necessarily limited to the specific features or acts described above. Rather, the specific features and acts described above are disclosed as embodiment forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". The claimed subject matter may be implemented as a method, apparatus, or article of manufacture (e.g., as software, firmware, hardware, or any combination thereof).

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Further, unless specified otherwise, "first," "second," and/or the like are not intended to imply a temporal aspect, a spatial aspect, an ordering, etc. Rather, such terms are merely used as identifiers, names, etc. for features, elements, items, etc. (e.g., "a first channel and a second channel" generally corresponds to "channel A and channel B" or two different (or identical) channels or the same channel).

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An electronics arrangement of a photon counting detector array, comprising:
   an integration circuit configured to integrate charge generated by a detector cell of the photon counting detector array to generate a voltage signal;
   a comparator configured to compare the voltage signal to a reference voltage to generate a digital output; and
   a digital discriminator configured to analyze the digital output to identify whether a pulse in the digital output corresponds to a detection event on the detector cell or corresponds to noise in the voltage signal.

2. The electronics arrangement of claim 1, wherein the digital discriminator is configured to compare a result of an analysis of the digital output to one or more metrics derived based upon an impulse response of the detector cell.

3. The electronics arrangement of claim 2, the impulse response of the detector cell a function of at least one of a composition of a radiation detection element of the detector cell or a thickness of the radiation detection element.

4. The electronics arrangement of claim 1, wherein the digital discriminator is configured to determine a period during which the voltage signal exceeds the reference voltage.

5. The electronics arrangement of claim 4, wherein the digital discriminator is configured to identify the detection event when the period exceeds a specified time threshold.

6. The electronics arrangement of claim 1, wherein the digital discriminator comprises a pulse counter, the pulse counter incremented when the voltage signal exceeds the reference voltage during a clock cycle and decremented when the voltage signal does not exceed the reference voltage during a subsequent clock cycle.

7. The electronics arrangement of claim 6, wherein the digital discriminator is configured to identify the detection event when the pulse counter exceeds a specified count.

8. The electronics arrangement of claim 1, comprising an analog filter electrically coupled between the integration circuit and the comparator.

9. The electronics arrangement of claim 8, wherein a full width at half maximum (FWHM) of the analog filter is less than a FWHM of an impulse response of a radiation detection element of the detector cell.

10. The electronics arrangement of claim 1, comprising a second digital discriminator configured to use the digital output to identify the detection event, the second digital discriminator in operable communication with the digital discriminator.

11. The electronics arrangement of claim 1, the digital discriminator in operable communication with a neighboring digital discriminator of a neighboring detector cell of the photon counting detector array.

12. A method for counting detection events via a photon counting detector array, comprising:
   generating a voltage signal based upon electrical charge yielded from a detector cell of the photon counting detector array;
   converting the voltage signal from an analog domain to a digital domain to generate a digital output; and
   discriminating the digital output to identify whether a pulse in the digital output corresponds to a detection event on the detector cell or corresponds to noise in the voltage signal based upon an impulse response of the detector cell.

13. The method of claim 12, comprising:
   determining the impulse response of the detector cell based upon at least one of:
      a composition of a radiation detection element of the detector cell;
      a thickness of the radiation detection element; or
      an energy spectrum of radiation emitted from a radiation source configured to expose the photon counting detector array to radiation.

14. The method of claim 12, wherein the discriminating comprises:
   identifying the detection event when a period during which the voltage signal exceeds a specified voltage threshold exceeds a specified time threshold determined based upon the impulse response of the detector cell.

15. The method of claim 14, comprising:
identifying a second detection event when the period during which the voltage signal exceeds the specified voltage threshold exceeds a second specified time threshold determined based upon the impulse response of the detector cell.

16. The method of claim 12, wherein the discriminating comprises:
incrementing a pulse counter when the voltage signal exceeds a specified voltage threshold during a clock cycle; and
decrementing the pulse counter when the voltage signal does not exceed the specified voltage threshold during a subsequent clock cycle.

17. The method of claim 12, comprising:
filtering, via an analog filter, the voltage signal to limit a noise bandwidth of the voltage signal.

18. The method of claim 17, wherein a full width at half maximum (FWHM) of the analog filter is less than a FWHM of an impulse response of a radiation detection element of the detector cell.

19. The method of claim 12, comprising:
communicating an identification of the detection event from a first digital discriminator of the detector cell to a second digital discriminator of the detector cell.

20. A non-transitory computer readable medium comprising processor executable instructions that when executed perform a method for counting detection events via a photon counting detector array, the method comprising:
generating a voltage signal based upon electrical charge yielded from a detector cell of the photon counting detector array;
filtering, via an analog filter, the voltage signal to limit a noise bandwidth of the voltage signal;
converting, after the filtering, the voltage signal from an analog domain to a digital domain to generate a digital output; and
discriminating, via a digital discriminator, the digital output to identify whether a pulse in the digital output corresponds to a detection event on the detector cell or corresponds to noise in the voltage signal.

* * * * *